US012489252B2

(12) United States Patent
Sekino et al.

(10) Patent No.: US 12,489,252 B2
(45) Date of Patent: Dec. 2, 2025

(54) ERRONEOUS FITTING PREVENTION CONNECTOR

(71) Applicant: YAZAKI CORPORATION, Tokyo (JP)

(72) Inventors: Tetsuya Sekino, Makinohara (JP); Yoshinobu Iwasaki, Fujieda (JP)

(73) Assignee: YAZAKI CORPORATION, Tokyo (JP)

(*) Notice: Subject to any disclaimer, the term of this patent is extended or adjusted under 35 U.S.C. 154(b) by 284 days.

(21) Appl. No.: 18/467,634

(22) Filed: Sep. 14, 2023

(65) Prior Publication Data

US 2024/0106169 A1 Mar. 28, 2024

(30) Foreign Application Priority Data

Sep. 26, 2022 (JP) ................................ 2022-152926

(51) Int. Cl.
*H01R 13/64* (2006.01)
*H01R 13/516* (2006.01)
*H01R 13/629* (2006.01)

(52) U.S. Cl.
CPC .......... *H01R 13/64* (2013.01); *H01R 13/516* (2013.01); *H01R 13/629* (2013.01)

(58) Field of Classification Search
CPC ............................ H01R 13/631; H01R 13/506
USPC .................................................. 439/680, 357
See application file for complete search history.

(56) References Cited

U.S. PATENT DOCUMENTS 10,498,077 B2 * 12/2019 Ohsako ................ H01R 12/716
10,790,619 B2 * 9/2020 Elkhatib .............. H05K 9/0098
10,985,502 B2 * 4/2021 Kudo .................. H01R 13/506

FOREIGN PATENT DOCUMENTS

JP H09-129311 A 5/1997

* cited by examiner

*Primary Examiner* — Phuong K Dinh
(74) *Attorney, Agent, or Firm* — KENEALY VAIDYA LLP

(57) ABSTRACT

An erroneous fitting prevention connector includes: a connector housing having a guide projection; and a mating connector housing having a rectangular tubular hood portion and a guide groove provided to be recessed on an inner wall surface of one side wall of the hood portion and extending along a fitting direction. At a front end portion of the other side wall parallel to the one side wall of the hood portion, an interference portion against which a housing front side end surface of the guide projection abuts when the connector housing is in a wrong insertion position, is formed. The interference portion has a contacted recess portion and an inclined contacted surface. The housing front side end surface has a contact surface that comes into contact with a bottom surface of the contacted recess portion, and an inclined contact surface that comes into contact with the inclined contacted surface.

2 Claims, 11 Drawing Sheets

ERRONEOUS FITTING PREVENTION CONNECTOR

CROSS-REFERENCE TO RELATED APPLICATION(S)

This application is based upon and claims the benefit of priority from prior Japanese patent application No. 2022-152926 filed on Sep. 26, 2022, the entire contents of which are incorporated herein by reference.

BACKGROUND

1. Field of the Invention

The present disclosure relates to an erroneous fitting prevention connector.

2. Description of the Related Art

There is a connector that has a guide projection provided in a protruding manner on one housing and a guide groove for receiving the guide projection provided to be recessed on the other housing in a fitting direction, such that an erroneous fitting prevention function of preventing erroneous fitting due to a wrong insertion position different from a proper insertion position.

For example, in an erroneous insertion prevention structure for a connector disclosed in JPH09-129311A, a recess is formed in an opening of an insertion hole (hood portion) of a female connector, which is mutually fitted and locked to a protrusion portion provided in a protruding manner in an insertion direction on a guide projection of a male connector to prevent further insertion. Further, in a fitting and locking portion of at least one of the protrusion portion and the recess, an inwardly inclined surface is formed to direct the opening side of an outer wall of the insertion hole of the female connector inward. Therefore, even when an attempt is made to forcibly insert both connectors with a large pressing force, insertion of the male connector into the female connector is prevented by the mutual fitting and locking of the protrusion portion and the recess.

However, in the erroneous insertion prevention structure of the connector described above, when both connectors are forcibly inserted with a large pressing force during erroneous fitting, due to the contact between the protrusion portion and the recess, the pressing force in the fitting direction is concentrated on the outer wall of the insertion hole of the female connector in which the recess is formed. Furthermore, due to the action of the inwardly inclined surface formed in the fitting and locking portion, stress acts on the outer wall in the plate thickness direction. As a result, excessive stress is applied to the coupling part between the outer wall in which the recess is formed and the adjacent outer wall, and the insertion hole (hood portion) may be damaged.

SUMMARY

An object of the present disclosure is to provide an erroneous fitting prevention connector capable of suppressing damage to the hood portion and enhancing the reliability of the erroneous fitting prevention function.

According to an aspect of the present disclosure, there is provided an erroneous fitting prevention connector including: a connector housing having a guide projection provided in a protruding manner on one side surface at a front of a housing; and a mating connector housing having a rectangular tubular hood portion fitted to an outer periphery of the connector housing, and a guide groove provided to be recessed on an inner wall surface of one side wall of the hood portion and extending along a fitting direction, in which connector fitting is permitted while the guide projection is fitted into the guide groove only when the connector housing and the mating connector housing are in proper insertion positions, where: a front end portion of the other side wall parallel to the one side wall of the hood portion is formed with an interference portion against which a housing front side end surface of the guide projection abuts when the connector housing is half-rotated with respect to the hood portion and is in a wrong insertion position; the interference portion has a contacted recess portion provided to be recessed on a front end surface of the other side wall, and an inclined contacted surface formed continuously with a bottom surface of the contacted recess portion and the front end surface of the other side wall and inclined along a direction parallel to an opening edge of the other side wall; and the housing front side end surface has a contact surface that comes into contact with the bottom surface of the contacted recess portion, and an inclined contact surface that is formed continuously with the contact surface and comes into contact with the inclined contacted surface.

The erroneous fitting prevention connector according to the present disclosure can suppress damage to the hood portion, and enhance the reliability of the erroneous fitting prevention function.

The present disclosure has been briefly described above. Furthermore, the details of the present disclosure will be further clarified by reading the modes for carrying out the disclosure described below (hereinafter referred to as an "embodiment") with reference to the accompanying drawings.

BRIEF DESCRIPTION OF THE DRAWINGS

The present disclosure will become more fully understood from the detailed description given hereinbelow and the accompanying drawing which is given by way of illustration only, and thus is not limitative of the present disclosure and wherein.

DETAILED DESCRIPTION OF THE INVENTION

Figure 1:
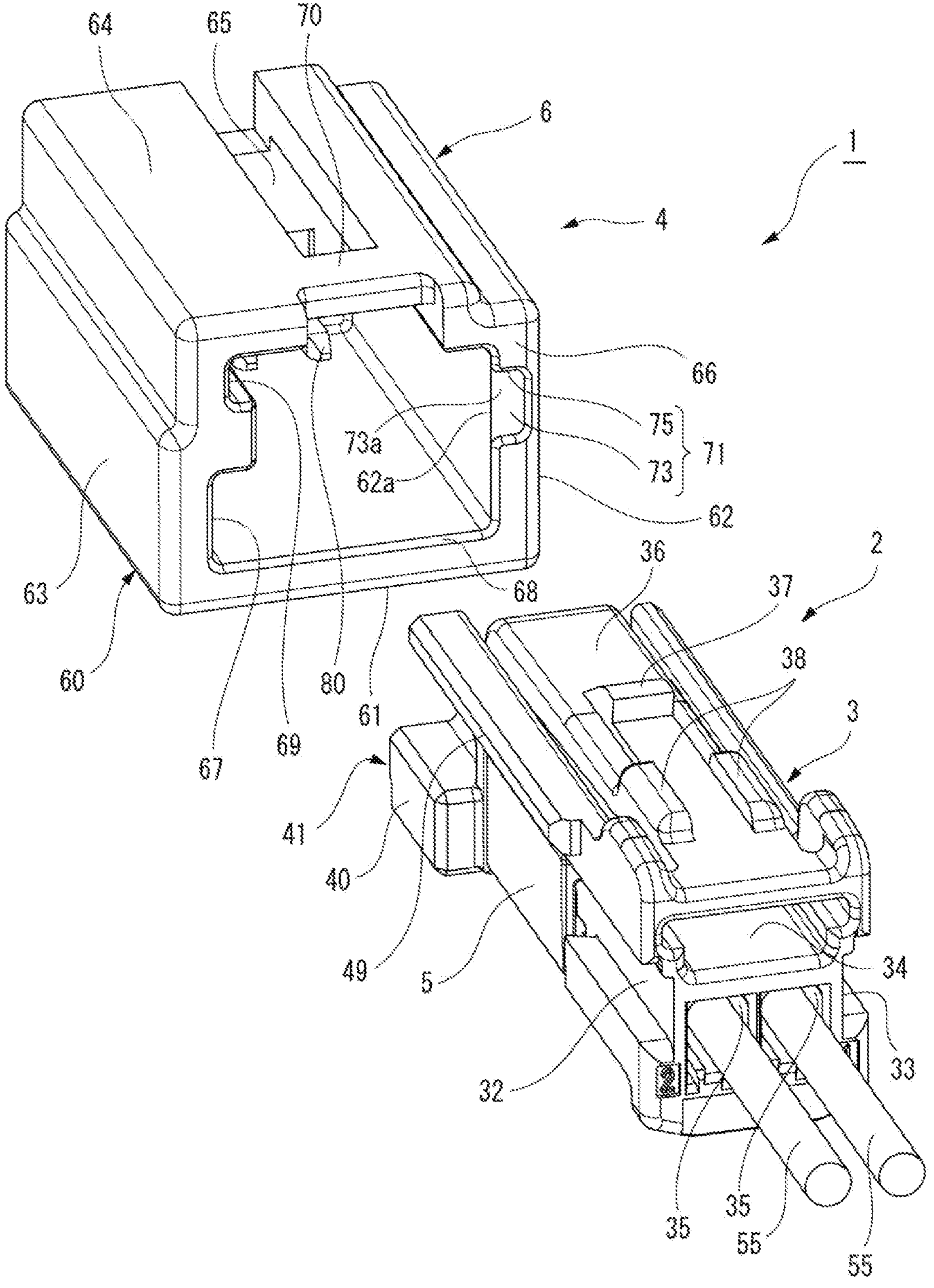
FIG. 1 is an exploded perspective view of an erroneous fitting prevention connector according to an embodiment of the present disclosure.

Specific embodiments relating to the present disclosure will be described below with reference to each drawing. FIG. 1 is an exploded perspective view of an erroneous fitting prevention connector 1 according to an embodiment of the present disclosure.

The erroneous fitting prevention connector 1 according to the present embodiment includes a connector 2 and a mating connector 4 to be fitted to the connector 2. In the present embodiment, the connector 2 is a female connector having a female connector housing 3 (connector housing) in which female terminals 57 are accommodated. The mating connector 4 is a male connector having a male connector housing 6 (mating connector housing) in which male terminals 80 are accommodated. Note that the male and female connectors are not limited to this.

Figure 3:
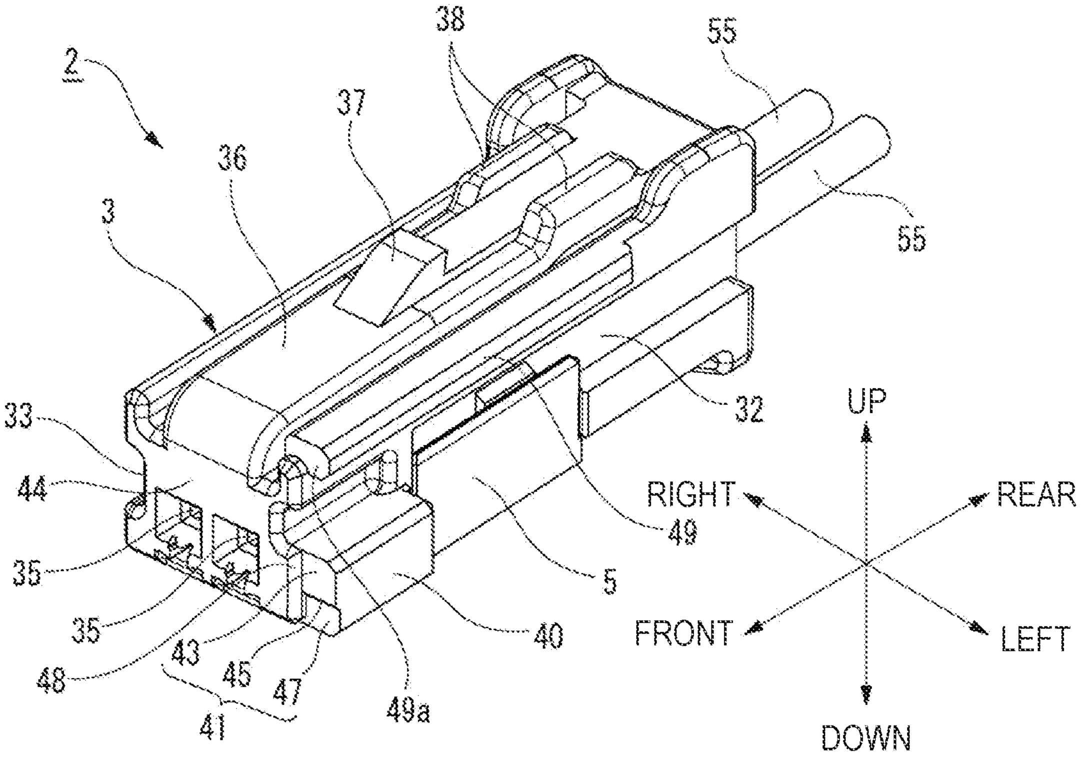
FIG. 3 is a perspective view of the connector shown in FIG. 2 as viewed from a front upper side.

In this specification, a front-rear direction, an up-down direction, and a left-right direction of the connector 2 follow the directions of the arrows shown in FIG. 3. That is, the front-rear direction of the connector 2 is the direction along the connector fitting direction, and the side to which the mating connector 4 is fitted is defined as the front of the connector 2. Further, a front-rear direction, an up-down direction, and a left-right direction of the mating connector 4 follow the directions of the arrows shown in FIG. 5. That is, the front-rear direction of the mating connector 4 is the direction along the connector fitting direction, and the side to which the connector 2 is fitted is defined as the front of the mating connector 4.

Figure 2:
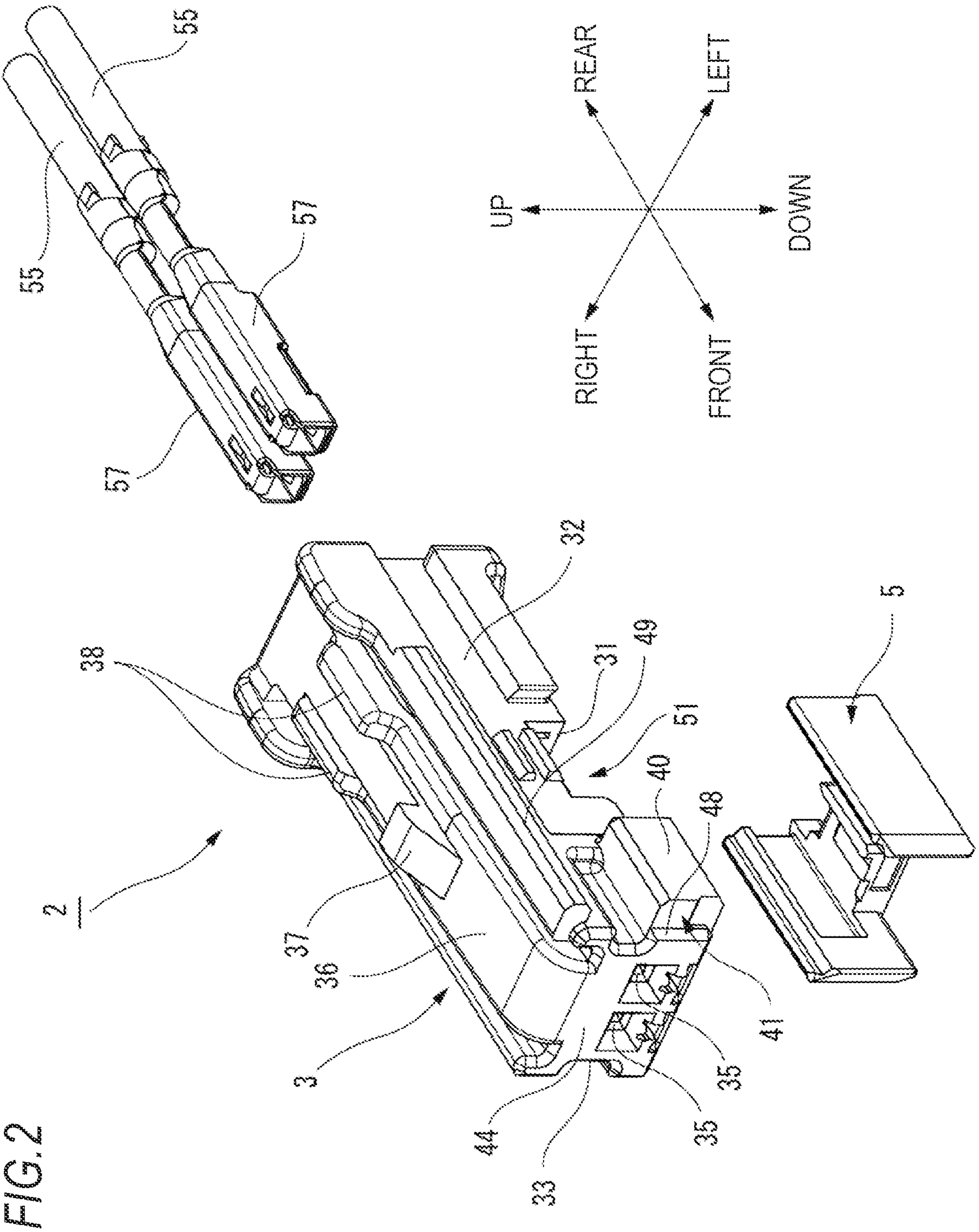
FIG. 2 is an exploded perspective view of the connector shown in FIG. 1.
Figure 4:
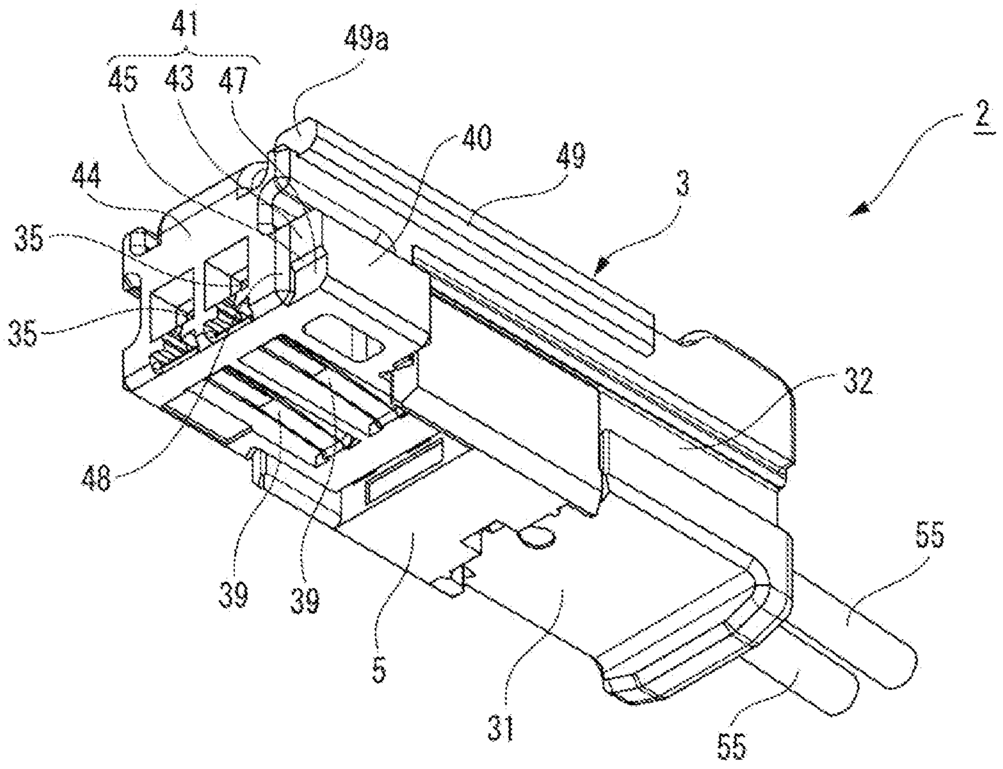
FIG. 4 is a perspective view of the connector shown in FIG. 2 as viewed from a front lower side.

FIG. 2 is an exploded perspective view of the connector 2 shown in FIG. 1. FIGS. 3 and 4 are a perspective view of the connector 2 shown in FIG. 2 as viewed from the front upper side and a perspective view of the connector 2 as viewed from a front lower side. The connector 2 includes the female connector housing 3 as the connector housing, a side spacer 5, and a pair of the female terminals 57, as shown in FIGS. 2 to 4. The female connector housing 3 is molded from an electrically insulating synthetic resin. The side spacer 5 is molded from an electrically insulating synthetic resin.

The female connector housing 3 is molded in a rectangular tubular shape having a bottom wall 31, left and right side walls 32 and 33, and an upper wall 34, and is molded with a pair of terminal accommodation chambers 35 penetrating in the front-rear direction. An elastic locking piece 39 (flexible lance) is formed on the bottom wall 31 of the female connector housing 3 to protrude in the terminal accommodation chamber 35.

A spacer insertion hole 51 is formed on the bottom wall 31 of the female connector housing 3 to traverse a part of the terminal accommodation chamber 35 in the terminal insertion direction (connector fitting direction) and the crossing direction (left-right direction). As shown in FIGS. 3 and 4, the side spacer 5 is assembled to the spacer insertion holes 51 in a temporarily locked state.

The female terminal 57 is formed of a conductive metal in a rectangular tubular shape. The female terminal 57 is electrically connected to an end of a covered wire 55. The female terminals 57 inserted into the terminal accommodation chambers 35 of the female connector housing 3 are retained in the terminal accommodation chambers 35 by being locked to the elastic locking pieces 39. Further, the female terminals 57 are doubly locked by the side spacer 5 by bringing the side spacer 5 assembled to the female connector housing 3 into a fully locked state.

The upper wall 34 of the female connector housing 3 is formed with an elastically deformable lock arm 36 provided with a lock projection 37 and an operation projection portion 38. A guide projection 40 and a guide rib 49 are provided in a protruding manner on the left side wall 32 which is one side surface of the female connector housing 3.

As shown in FIGS. 3 and 4, the guide projection 40 is a substantially rectangular parallelepiped projection provided in a protruding manner on the left side wall 32 at the front of the housing and extending in the front-rear direction (connector fitting direction). A housing front side end surface 41 of the guide projection 40 has a contact surface 43 and an inclined contact surface 45 formed continuously with the contact surface 43. Furthermore, the guide projection 40 of the present embodiment has a front end surface contact surface 47 formed continuously with the inclined contact surface 45. The guide rib 49 is a projection thread provided in a protruding manner on the left side wall 32 at the upper part of the housing and extending in the front-rear direction.

An inclined surface 48 is formed continuously with a front end surface 44 on the outer peripheral edge of the front end surface 44 of the female connector housing 3. The inclined surface 48 is a guide surface that is in sliding contact with an inclined surface 68 of a hood portion 60 (which will be described later) and guides the insertion of the connector 2 into a fitting space, when the connector 2 and the mating connector 4 are fitted to each other.

Figure 5:
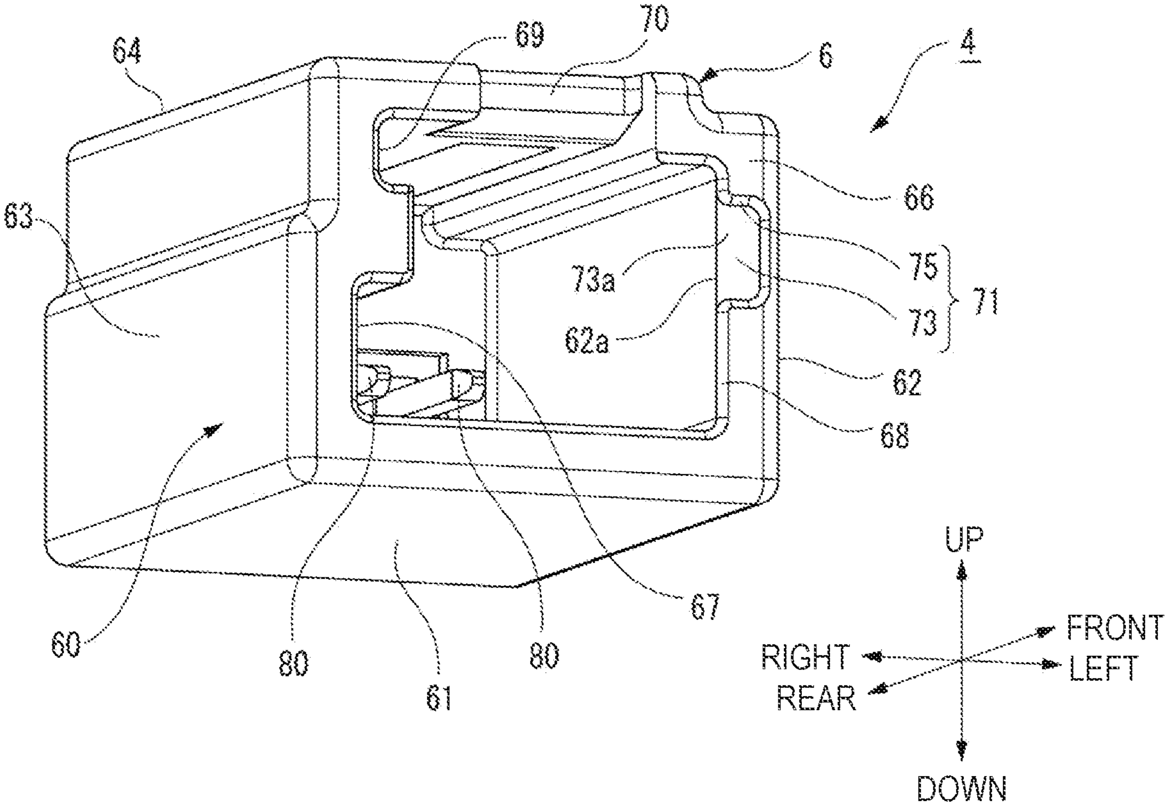
FIG. 5 is a perspective view of a mating connector shown in FIG. 1 as viewed from the front lower side.
Figure 6:
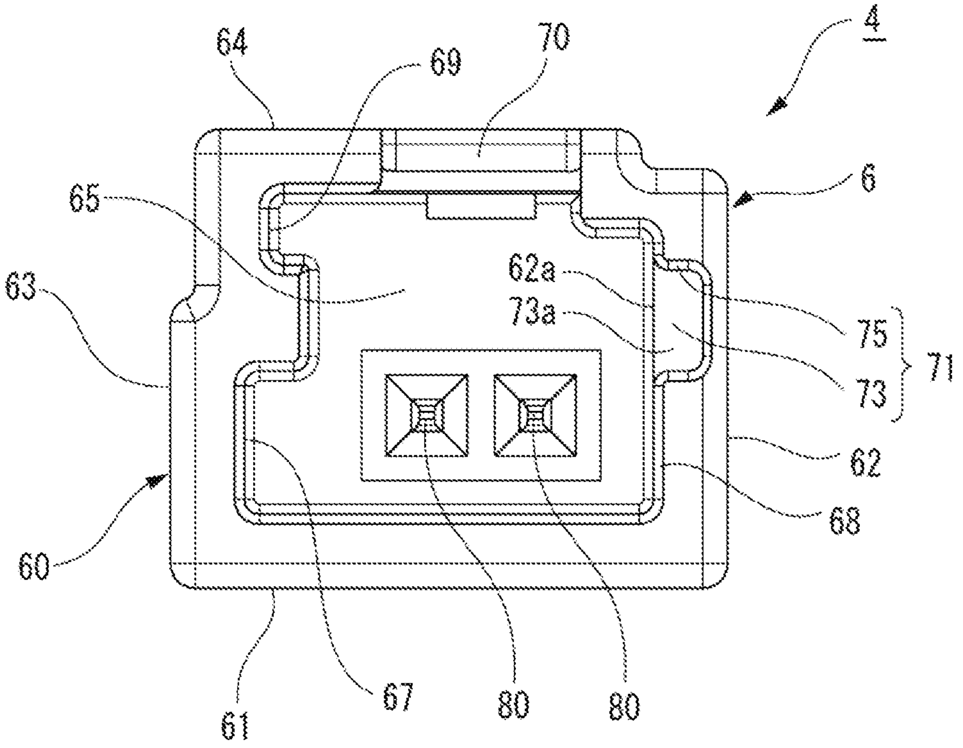
FIG. 6 is a front view of the mating connector shown in FIG. 1 as viewed from a front.

FIGS. 5 and 6 are a perspective view of the mating connector 4 shown in FIG. 1 as viewed from the front lower side and a front view of the mating connector 4 as viewed from a front. The mating connector 4 includes the male connector housing 6 as the mating connector housing and male terminals 80, as shown in FIGS. 5 and 6. The male connector housing 6 is molded from an electrically insulating synthetic resin.

The male connector housing 6 is molded in a rectangular bottomed cylinder having a bottom wall 61, left and right side walls 62 and 63, an upper wall 64, and a back wall 65. The bottom wall 61, the left and right side walls 62 and 63, and the upper wall 64 form the rectangular cylindrical hood portion 60 fitted to the outer periphery of the female connector housing 3. That is, the hood portion 60 configures the substantially rectangular parallelepiped fitting space into which the female connector housing 3 is fitted.

The inclined surface 68 is formed continuously with a front end surface 66 on the inner peripheral edge of the front end surface 66 of the hood portion 60 on the fitting space side. The inclined surface 68 is a guide surface that is in sliding contact with the inclined surface 48 of the female connector housing 3 and guides the insertion of the connector 2 into the fitting space, when the connector 2 and the mating connector 4 are fitted to each other.

A pair of the male terminals 80 protruding in the fitting space are vertically provided on the back wall 65 of the male connector housing 6. The male terminal 80 is formed of a conductive metal in a pin shape. The male terminal 80 is electrically connected to the female terminal 57 accommodated in the terminal accommodation chamber 35 of the female connector housing 3 when the connector 2 and the mating connector 4 are fitted to each other. The upper wall 64 of the male connector housing 6 is formed with a locked portion 70 with which the lock arm 36 of the female connector housing 3 is engaged.

A lower guide groove 67 (guide groove) and an upper guide groove 69 extending along the fitting direction are provided to be recessed on an inner wall surface of the right side wall 63 which is one side wall of the hood portion 60 of the male connector housing 6. The lower guide groove 67 has a cross-sectional shape corresponding to the guide projection 40 of the female connector housing 3. The upper guide groove 69 has a cross-sectional shape corresponding to the guide rib 49 of the female connector housing 3.

That is, connector fitting is permitted while the lower guide groove 67 and the upper guide groove 69 are fitted to the guide projections 40 and the guide ribs 49 only when the female connector housing 3 is in the proper insertion position with respect to the male connector housing 6.

An interference portion 71 is formed at a front end portion of the left side wall 62 that is the other side wall parallel to the right side wall 63 (one side wall) of the hood portion 60. When the female connector housing 3 is half-rotated around the fitting direction with respect to the hood portion 60 and is in a wrong insertion position, the housing front side end surface 41 of the guide projection 40 abuts against the interference portion 71.

The interference portion 71 includes a contacted recess portion 73 provided to be recessed on the front end surface 66 of the left side wall 62, and an inclined contacted surface 75 formed continuously with a bottom surface 73*a* of the contacted recess portion 73 and the front end surface 66 of the left side wall 62 and inclined along the direction parallel to an opening edge 62*a* of the left side wall 62. That is, on the housing front side end surface 41 of the guide projection 40, the contact surface 43 comes into contact with the bottom surface 73*a* of the contacted recess portion 73, and the inclined contact surface 45 comes into contact with the inclined contacted surface 75. Furthermore, the front end surface contact surface 47 of the guide projection 40 also comes into contact with the front end surface 66 of the left side wall 62.

When the female connector housing 3 is half-rotated around the fitting direction with respect to the hood portion 60 and is in the wrong insertion position, a front end surface 49*a* of the guide rib 49 abuts against the front end surface 66 of the left side wall 62.

Figure 7:
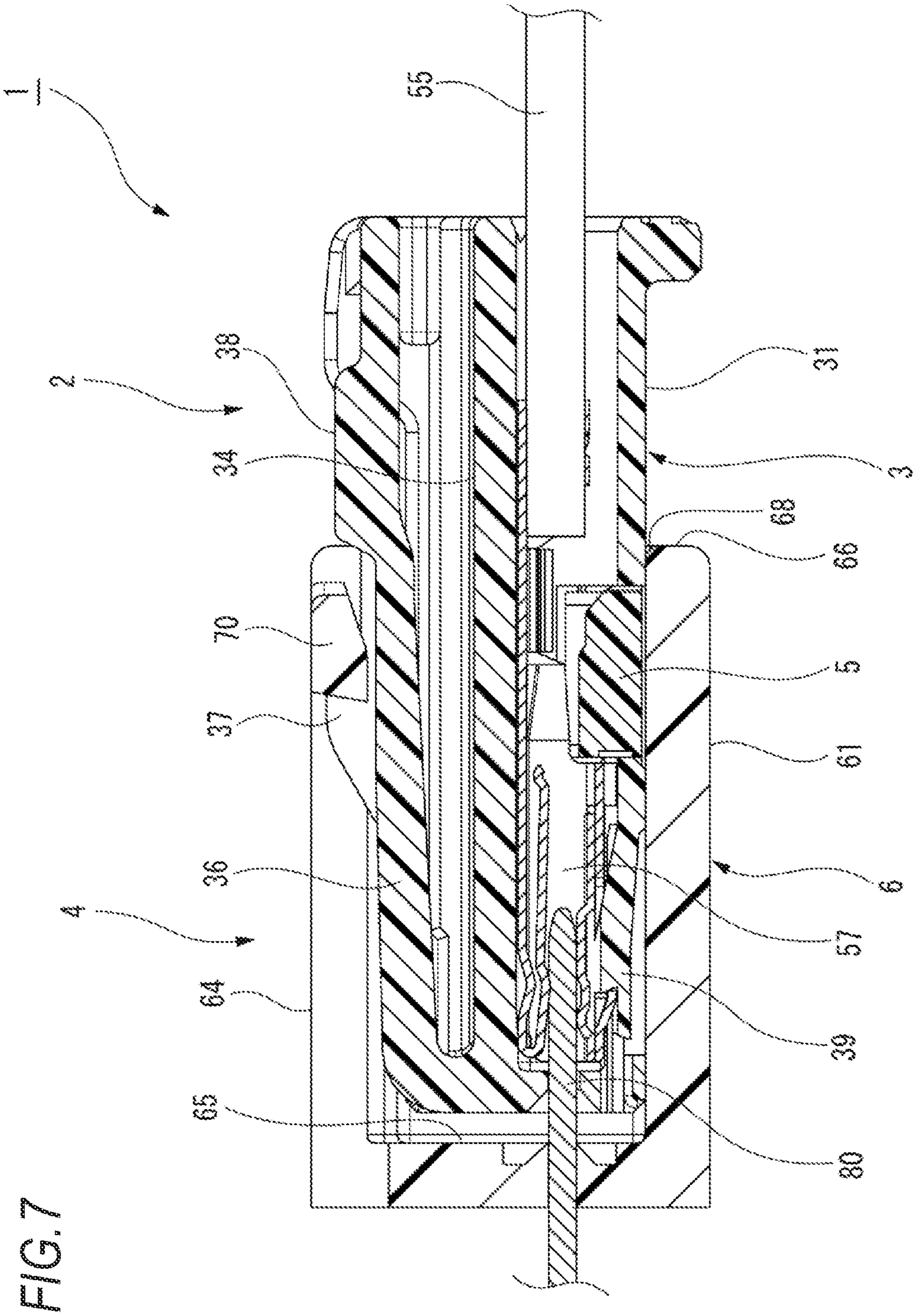
FIG. 7 is a longitudinal cross-sectional view showing a state where the erroneous fitting prevention connector shown in FIG. 1 is properly fitted.
Figure 8:
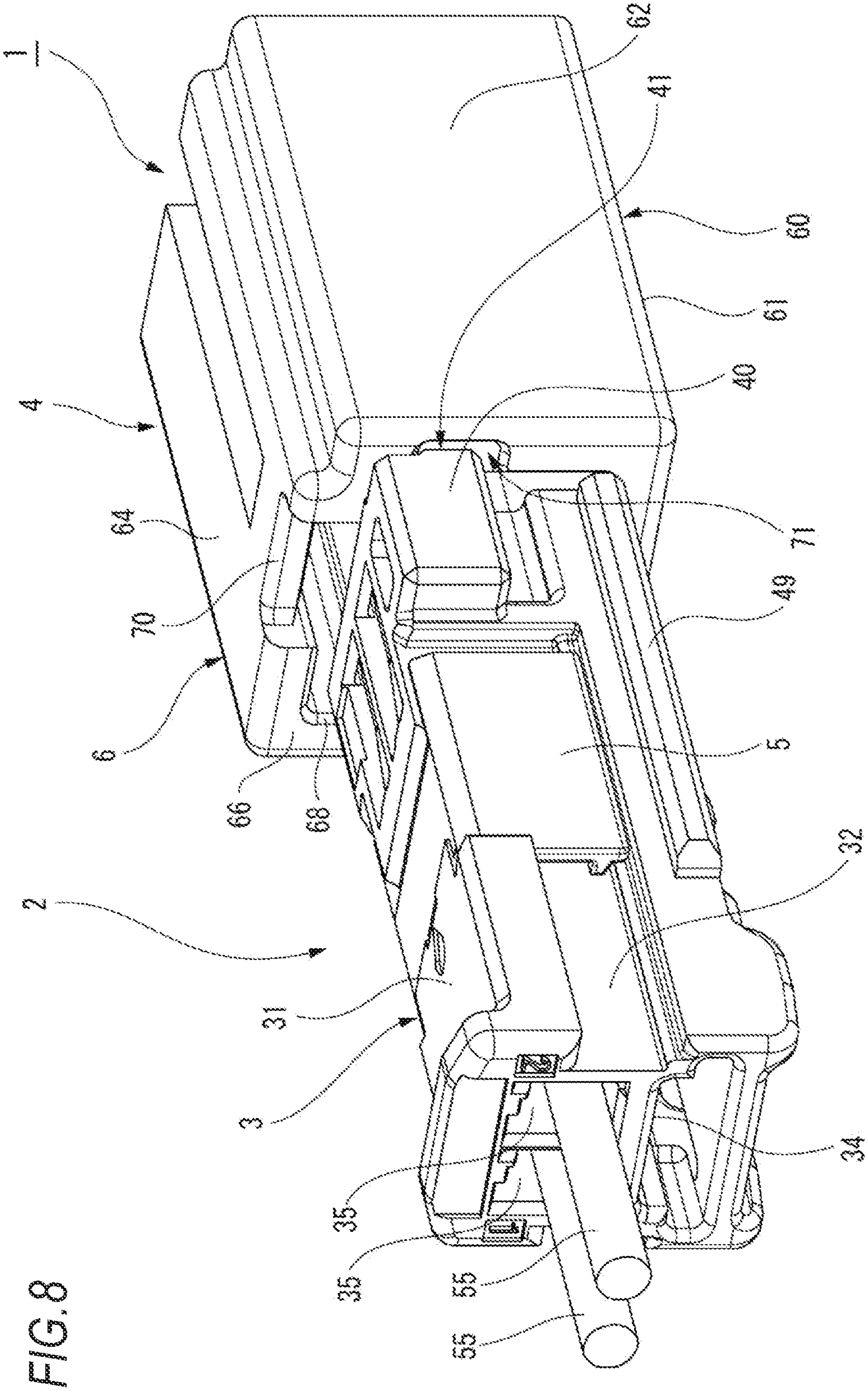
FIG. 8 is a perspective view showing the erroneous fitting prevention connector in a state where the connector is half-rotated with respect to the mating connector and is in a wrong insertion position.
Figure 9:
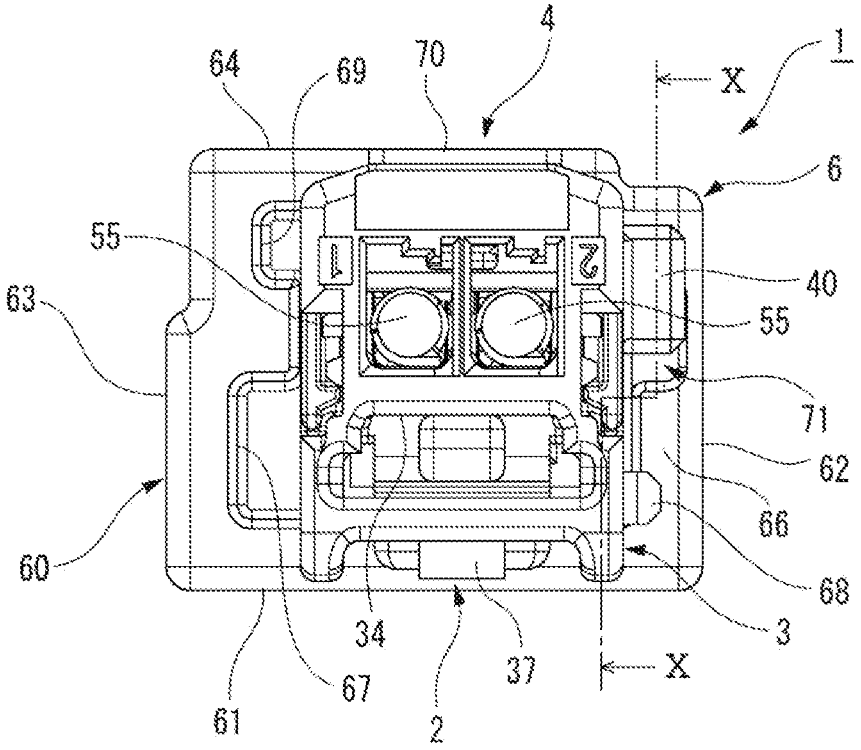
FIG. 9 is a front view of the erroneous fitting prevention connector shown in FIG. 8 as viewed from the front of the mating connector.
Figure 10:
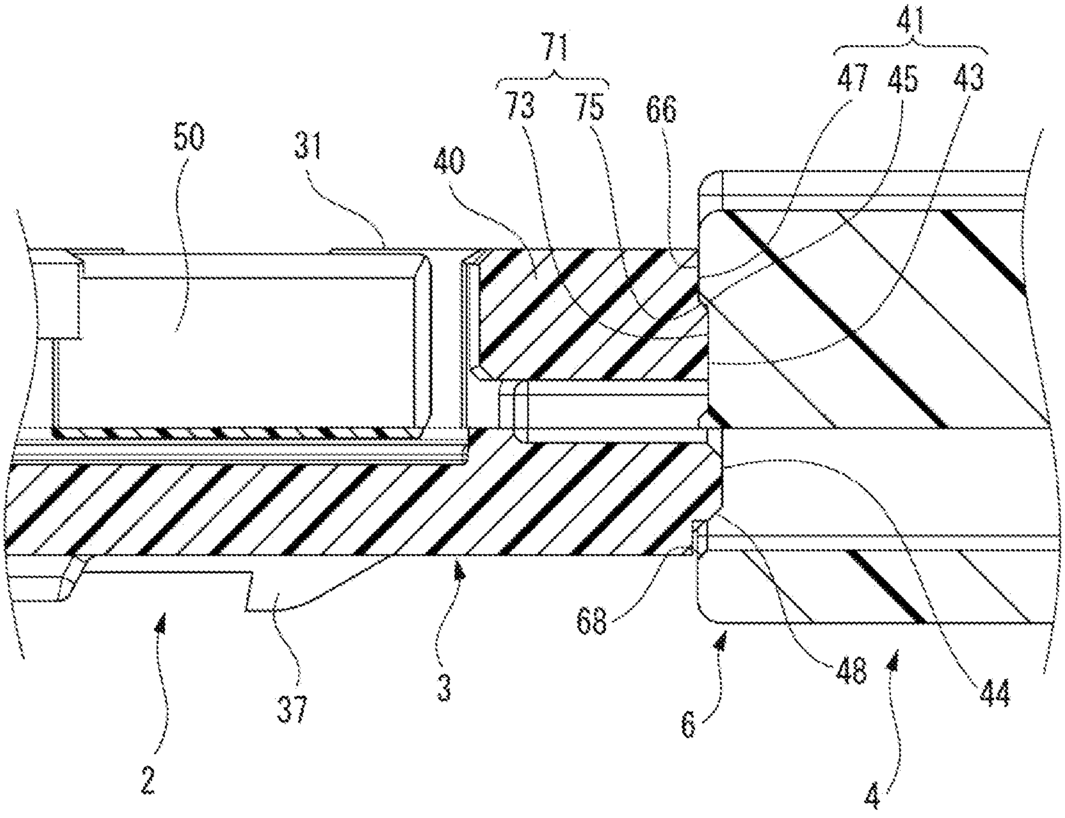
FIG. 10 is a cross-sectional view taken along line X-X of FIG. 9.
Figure 11:
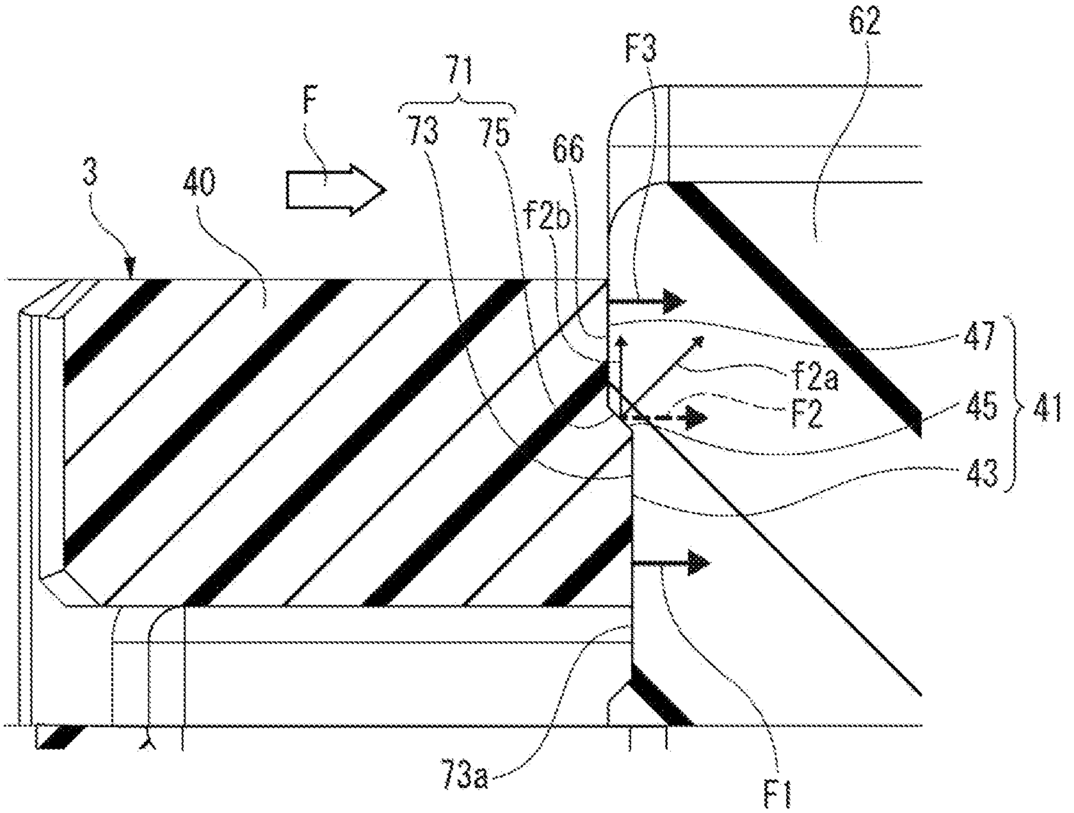
FIG. 11 is an enlarged view of a main portion of FIG. 10.

Next, the case of fitting the erroneous fitting prevention connector 1 will be described. FIG. 7 is a longitudinal cross-sectional view showing a state where the erroneous fitting prevention connector 1 shown in FIG. 1 is properly fitted. FIG. 8 is a perspective view showing the erroneous fitting prevention connector 1 in a state where the connector 2 is half-rotated with respect to the mating connector 4 and is in the wrong insertion position. FIG. 9 is a front view of the erroneous fitting prevention connector 1 shown in FIG. 8 as viewed from the front of the mating connector 4. FIG. 10 is a cross-sectional view taken along line X-X of FIG. 9. FIG. 11 is an enlarged view of a main portion of FIG. 10.

When fitting the erroneous fitting prevention connector 1, the front end of the female connector housing 3 of the connector 2 is oriented toward and brought close to the front end of the male connector housing 6 of the mating connector 4 in order to fit the connector 2 to the mating connector 4. Then, the female connector housing 3 is inserted into the hood portion 60 while the inclined surface 48 of the female connector housing 3 is brought into sliding contact with the inclined surface 68 of the hood portion 60 of the male connector housing 6.

Then, as shown in FIG. 7, when the mating connector 4 and the connector 2 are properly fitted to each other, the lock projection 37 of the lock arm 36 is locked to the locked portion 70 of the male connector housing 6. As a result, the mating connector 4 and the connector 2 are locked in a fitted state. In the fitted state, the female terminal 57 connected to the end of the covered wire 55 and accommodated in the terminal accommodation chamber 35 of the female connector housing 3 is electrically connected to the male terminal 80 accommodated in the male connector housing 6.

On the other hand, when the female connector housing 3 is turned upside down with respect to the hood portion 60 of the male connector housing 6 and is in the wrong insertion position, as shown in FIGS. 8 to 10, when the female connector housing 3 is inserted into the hood portion 60 while the inclined surface 48 of the female connector housing 3 is brought into sliding contact with the inclined surface 68 of the hood portion 60, the housing front side end surface 41 of the guide projection 40 of the female connector housing 3 abuts against the interference portion 71 of the hood portion 60. At the same time, the front end surface contact surface 47 of the guide projection 40 abuts against the front end surface 66 of the left side wall 62. Furthermore, the front end surface 49*a* of the guide rib 49 of the female connector housing 3 abuts against the front end surface 66 of the hood portion 60.

Therefore, the female connector housing 3 cannot be fitted into the hood portion 60 of the male connector housing 6 any more. At this time, as shown in FIG. 11, a pressing force F for forcible insertion is applied to the left side wall 62 of the hood portion 60 of the male connector housing 6. At this time, the contact surface 43 of the guide projection 40 comes into contact with the bottom surface 73*a* of the contacted recess portion 73 of the left side wall 62 of the hood portion 60, and accordingly, a pressing force F1 in the fitting direction is applied to the left side wall 62. At the same time, the inclined contact surface 45 of the guide projection 40 comes into contact with the inclined contacted surface 75 of the left side wall 62 of the hood portion 60, and accordingly, a dispersed pressing force f2*a* and a dispersed pressing force f2*b* which are dispersed in the direction crossing the fitting direction from a pressing force F2 in the fitting direction are applied to the left side wall 62.

As a result, in the erroneous fitting prevention connector 1 according to the present embodiment, as for the pressing force F applied from the housing front side end surface 41 of the guide projection 40 to the left side wall 62, not only the pressing force F1 in the fitting direction but also the dispersed pressing force f2*a* and the dispersed pressing force f2*b* which are not in the fitting direction are applied to the left side wall 62. Further, the dispersed pressing force f2*a* and the dispersed pressing force f2*b* by the inclined contact surface 45 of the guide projection 40 which comes into contact with the inclined contacted surface 75 inclined along the direction parallel to the opening edge 62*a* of the left side wall 62 do not exert stress in the plate thickness direction of the left side wall 62.

Therefore, the left side wall 62 is pushed outward, excessive stress is not applied to each coupling part between the left side wall 62, and the upper wall 64 and the bottom wall 31 adjacent to the left side wall 62, and it is possible to suppress the occurrence of cracks from the front end side of the coupling part of the hood portion 60 and suppress the damage to the hood portion 60 itself.

Further, in the erroneous fitting prevention connector 1 according to the present embodiment, the front end surface contact surface 47 of the guide projection 40 comes into contact with the front end surface 66 of the left side wall 62 of the hood portion 60, and accordingly, a pressing force F3 in the fitting direction is applied to the left side wall 62.

Therefore, the pressing force F is dispersed into the pressing force F1, the dispersed pressing force f2a, the dispersed pressing force f2b, and the pressing force F3, and is applied to the left side wall 62 without being concentrated, and thus it is possible to further suppress the damage to the hood portion 60.

In the erroneous fitting prevention connector 1 according to the present embodiment, damage to the hood portion 60 can be suppressed, and the reliability of the erroneous fitting prevention function can be enhanced.

It is to be noted that the present disclosure is not limited to the above-described embodiment, and can be appropriately modified, improved, and the like. In addition, any material, shape, size, number, location, and the like of each component in the above-described embodiment are applied and not limited as long as the present disclosure can be achieved.

Here, the features of the embodiment of the erroneous fitting prevention connector according to the present disclosure described above are briefly summarized and listed below.

<1> An erroneous fitting prevention connector (1) including: a connector housing (female connector housing 3) having a guide projection (40) provided in a protruding manner on one side surface at a front of a housing; and a mating connector housing (female connector housing 3) having a rectangular tubular hood portion (60) fitted to an outer periphery of the connector housing (male connector housing 3), and a guide groove (lower guide groove 67) provided to be recessed on an inner wall surface of one side wall (right side wall 63) of the hood portion (60) and extending along a fitting direction, in which connector fitting is permitted while the guide projection (40) is fitted into the guide groove (lower guide groove 67) only when the connector housing (female connector housing 3) and the mating connector housing (male connector housing 6) are in proper insertion positions, in which at a front end portion of the other side wall (left side wall 62) parallel to the one side wall (right side wall 63) of the hood portion (60), an interference portion (71) against which a housing front side end surface (41) of the guide projection (40) abuts when the connector housing (female connector housing 3) is half-rotated with respect to the hood portion (60) and is in a wrong insertion position, is formed, the interference portion (71) has a contacted recess portion (73) provided to be recessed on a front end surface (66) of the other side wall (left side wall 62), and an inclined contacted surface (75) formed continuously with a bottom surface (73a) of the contacted recess portion (73) and the front end surface (66) of the other side wall (left side wall 62) and inclined along a direction parallel to an opening edge (62a) of the other side wall (left side wall 62), and the housing front side end surface (41) has a contact surface (43) that comes into contact with the bottom surface (73a) of the contacted recess portion (73), and an inclined contact surface (45) that is formed continuously with the contact surface (43) and comes into contact with the inclined contacted surface (75).

According to the erroneous fitting prevention connector (1) having the above-described configuration <1>, in a case where the connector housing (female connector housing 3) is turned upside down with respect to the hood portion (60) of the mating connector housing (male connector housing 6) and is in a wrong insertion position, when the connector housing (female connector housing 3) is inserted into the hood portion (60), the housing front side end surface (41) of the guide projection (40) of the connector housing (female connector housing 3) abuts against the interference portion (71) of the hood portion (60). At the same time, a front end surface contact surface (47) of the guide projection (40) abuts against the front end surface (66) of the other side wall (left side wall 62). Therefore, the connector housing (female connector housing 3) cannot be fitted into the hood portion (60) of the mating connector housing (male connector housing 6) any more. At this time, a pressing force (F) for forcible insertion is applied to the other side wall (left side wall 62) of the hood portion (60) of the mating connector housing (male connector housing 6). At this time, the contact surface (43) of the guide projection (40) comes into contact with the bottom surface (73a) of the contacted recess portion (73) of the other side wall (left side wall 62) of the hood portion (60), and accordingly, a pressing force (F1) in the fitting direction is applied to the other side wall (left side wall 62). At the same time, the inclined contact surface (45) of the guide projection (40) comes into contact with the inclined contacted surface (75) of the other side wall (left side wall 62) of the hood portion (60), and accordingly, a dispersed pressing force (f2a) and a dispersed pressing force (f2b) which are dispersed in the direction crossing the fitting direction from the pressing force (F2) in the fitting direction are applied to the other side wall (left side wall 62). As a result, in the erroneous fitting prevention connector (1) having the above-described configuration [1], as for the pressing force (F) applied from the housing front side end surface (41) of the guide projection (40) to the other side wall (left side wall 62), not only the pressing force (F1) in the fitting direction but also the dispersed pressing force (f2a) and the dispersed pressing force (f2b) which are not in the fitting direction are applied to the other side wall (left side wall 62). Further, the dispersed pressing force (f2a) and the dispersed pressing force (f2b) by the inclined contact surface (45) of the guide projection (40) which comes into contact with the inclined contacted surface (75) inclined along the direction parallel to the opening edge (62a) of the other side wall (left side wall 62) do not exert stress in the plate thickness direction of the other side wall (left side wall 62). Therefore, the other side wall (left side wall 62) is pushed outward, excessive stress is not applied to each coupling part between the other side wall (left side wall 62) and the side walls (the upper wall 64 and the bottom wall 31) adjacent to the other side wall (left side wall 62), and it is possible to suppress the occurrence of cracks from the front end side of the coupling part of the hood portion (60) and suppress the damage to the hood portion (60) itself.

<2> The erroneous fitting prevention connector (1) according to the above-described <1>, in which the housing front side end surface (41) has the front end surface contact surface (47) formed continuously with the inclined contact surface (45) and comes into contact with the front end surface (66) of the other side wall (left side wall 62).

According to the erroneous fitting prevention connector (1) having the above-described configuration <2>, the front end surface contact surface (47) of the guide projection (40) comes into contact with the front end surface (66) of the other side wall (left side wall 62) of the hood portion (60), and accordingly, a pressing force (F3) in the fitting direction is applied to the other side wall (left side wall 62). Therefore, the pressing force (F) is dispersed into the pressing force (F1), the dispersed pressing force (f2a), the dispersed pressing force (f2b), and the pressing force (F3), and is applied to the other side wall (left side wall 62) without being concentrated, and thus it is possible to further suppress the damage to the hood portion (60).

The invention claimed is:

1. An erroneous fitting prevention connector comprising:

a connector housing having a guide projection provided in a protruding manner on one side surface at a front of the connector housing; and a mating connector housing having a rectangular tubular hood portion fitted to an outer periphery of the connector housing, and a guide groove provided to be recessed on an inner wall surface of one side wall of the hood portion and extending along a fitting direction, in which connector fitting is permitted while the guide projection is fitted into the guide groove only when the connector housing and the mating connector housing are in proper insertion positions, wherein:

a front end portion of an other side wall parallel to the one side wall of the hood portion is formed with an interference portion against which a housing front side end surface of the guide projection abuts when the connector housing is half-rotated with respect to the hood portion and is in a wrong insertion position;

the interference portion has a contacted recess portion provided to be recessed on a front end surface of the other side wall, and an inclined contacted surface formed continuously with a bottom surface of the contacted recess portion and the front end surface of the other side wall and inclined along a direction parallel to an opening edge of the other side wall; and the housing front side end surface has a contact surface that comes into contact with the bottom surface of the contacted recess portion, and an inclined contact surface that is formed continuously with the contact surface and comes into contact with the inclined contacted surface.

2. The erroneous fitting prevention connector according to claim 1, wherein the housing front side end surface has a front end surface contact surface formed continuously with the inclined contact surface and comes into contact with the front end surface of the other side wall.

* * * * *